(12) United States Patent
Martin et al.

(10) Patent No.: US 7,645,385 B2
(45) Date of Patent: Jan. 12, 2010

(54) METHOD AND ARRANGEMENT FOR PROCESSING NITROGEN-CONCENTRATED EFFLUENTS IN A SEQUENTIAL FRACTIONATED CYCLE BIOLOGICAL REACTOR

(75) Inventors: Samuel Martin, Paris (FR); Adriana Gonzalez Ospina, Le Pecq (FR)

(73) Assignees: Suez Environment, Paris (FR); Degremont, Rueil-Malmaison (FR)

( * ) Notice: Subject to any disclaimer, the term of this patent is extended or adjusted under 35 U.S.C. 154(b) by 0 days.

(21) Appl. No.: 11/997,337

(22) PCT Filed: Jul. 27, 2006

(86) PCT No.: PCT/FR2006/001841

§ 371 (c)(1),
(2), (4) Date: Mar. 31, 2008

(87) PCT Pub. No.: WO2007/014994

PCT Pub. Date: Feb. 8, 2007

(65) Prior Publication Data

US 2008/0223784 A1   Sep. 18, 2008

(30) Foreign Application Priority Data

Aug. 1, 2005   (FR) .................................. 05 08201

(51) Int. Cl.
*C02F 3/30* (2006.01)
*C02F 3/12* (2006.01)
*G05B 15/00* (2006.01)

(52) U.S. Cl. ........................ 210/614; 210/630; 210/631; 210/143; 210/205; 210/903

(58) Field of Classification Search ................. 210/614, 210/630, 631, 198.1, 205, 206, 903, 143
See application file for complete search history.

(56) References Cited

U.S. PATENT DOCUMENTS

| | | | |
|---|---|---|---|
| 4,655,925 A | | 4/1987 | Tabata et al. |
| 5,989,428 A | * | 11/1999 | Goronszy .................... 210/605 |
| 6,312,599 B1 | * | 11/2001 | Reid ........................... 210/605 |
| 2002/0117444 A1 | * | 8/2002 | Mikkelson et al. .......... 210/605 |
| 2003/0136731 A1 | * | 7/2003 | Mandt ......................... 210/605 |

FOREIGN PATENT DOCUMENTS

WO   WO-00/05176   2/2000

OTHER PUBLICATIONS

Fux et al. "Nitrogen Removal From Digester Supernatant Via Nitrite—SBR or SHARON?", Water Sci. Technol.; Water Science and Technology 2003, vol. 48, No. 8, 2003, pp. 9-18.

* cited by examiner

*Primary Examiner*—Fred Prince
(74) *Attorney, Agent, or Firm*—Connolly Bove Lodge & Hutz LLP

(57) ABSTRACT

The invention relates to a method for processing nitrogen-concentrated effluents by ammonia oxidation into nitrites followed by nitrite denitritation in a gaseous nitrogen in a sequential biological reactor (1) consisting in pouring a processable effluent volume in to the reactor by successive volume fractions, in dividing the entire processing cycle into successive sub cycles, wherein each sub-cycle comprises a feeding phase, an aeration phase for nitrification and an anoxia phase along which a carbon-containing source is introduced into the reactor for converting nitrites into nitrogen. The inventive method also consists in evaluating a nitrogenous volume charge in the effluent to be processed, mainly by measuring the effluent conductivity (X) and the flow rate (Q) and in determining the number of feeding phases of the entire cycle according to nitrogenous charge and to a minimum volume of liquid in the reactor in such a way that an injected nitrogen concentration is diluted in the liquid volume, wherein the volume phase nitrogenous charge is however sufficient for producing a single shot or peak of the ammonia charge favourable for a nitrating biomass formation in the reactor.

18 Claims, 3 Drawing Sheets

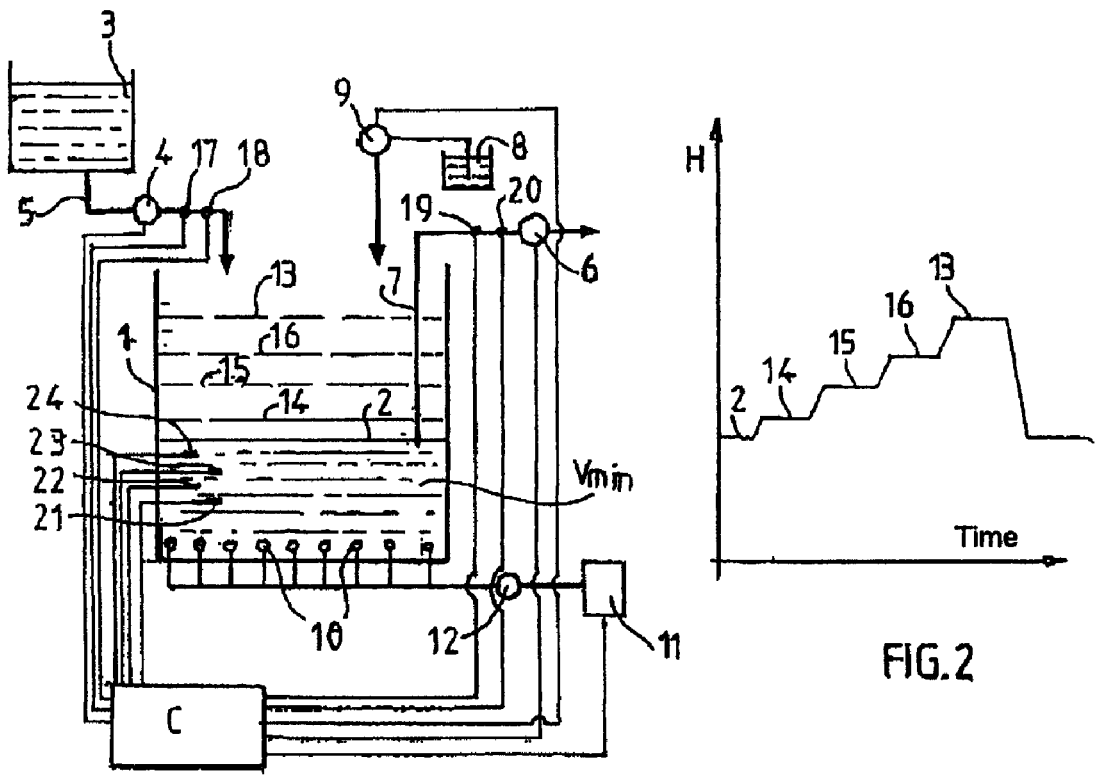
FIG.1
FIG.2
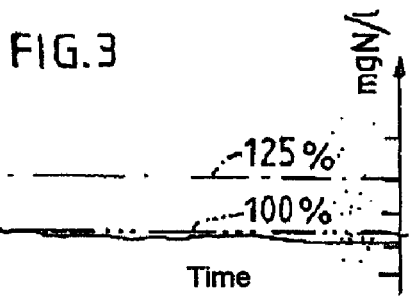
FIG.3

METHOD AND ARRANGEMENT FOR PROCESSING NITROGEN-CONCENTRATED EFFLUENTS IN A SEQUENTIAL FRACTIONATED CYCLE BIOLOGICAL REACTOR

CROSS REFERENCE TO RELATED APPLICATIONS

This application is a National Phase filing under 35 U.S.C. 371 of PCT/FR2006/001841 filed Jul. 27, 2006, which claims priority to Patent Application No. 0508201, filed in France on Aug. 1, 2005. The entire contents of each of the above-applications are incorporated herein by reference.

BACKGROUND OF THE INVENTION

The invention relates to a method for processing nitrogen-concentrated effluents, by oxidizing ammonium to nitrites followed by a denitration of the nitrites to nitrogen gas in a sequential biological reactor in which the reaction phases are fractionated, a method whereby an inflow volume to be processed is poured into the reactor containing nitrifying bacteria, the operating conditions being provided to privilege the action of the nitriting bacteria and to inhibit the action of the nitrating bacteria to the maximum, comprising processing cycles with at least one aeration phase to cause the nitrification, followed by a phase in which the aeration is stopped and a carbon source is introduced into the reactor for converting the nitrites to nitrogen.

The invention relates more particularly to the processing of effluents, in which the nitrogen concentration is higher than 100 mg N/l.

Processing of Nitrogen of Concentrated Effluents

Many pollutant processing installations are faced with growing difficulties associated with the control and the processing of their nitrogen-containing, chiefly ammoniacal releases, in the host environments. The ammonia is liable to cause environmental damage such as the oxygen depletion of aquatic environments, toxicity to fish, or eutrophization processes. To limit these impacts, the regulations impose increasingly stringent release limits, which often entail the costly revamping of existing processing stations.

One of the main methods for processing nitrogen is the biological method of nitrification/denitrification, whereby the ammonium is oxidized in two steps in aerated conditions, first to nitrites and then to nitrates, and is finally reduced to nitrogen gas in anoxic conditions. In the case of concentrated effluents, it is possible, by controlling various parameters, to short-circuit this biological process by carrying out a partial nitrification to nitrites, which are then directly denitrified. This method, also called "nitrate shunt" and already described in EP-A-826639 and WO 00/05176, is theoretically capable of reducing the oxygen inputs for nitrification by 25% and the biodegradable carbon inputs for denitrification by 40%, and also the associated production of heterotrophic sludge.

Wastewater treatment plants equipped with anaerobic digesters produce streams concentrated with ammonium (about 1000 mg N/l) in the sludge processing line which, when returned to the front end of the installation, may account for up to 20% of the total nitrogenous feed. Their specific processing would therefore serve in many cases to avoid the costly revamping of the main processing line to meet the release limits. Furthermore, a growing number of sites are forced to process the odors or offgases produced, generating condensates heavily laden with ammoniacal forms, which must absolutely be minimized. Finally, the leachates from landfills constitute a third type of effluent for which the ammonium ion represents one of the main sources of pollution.

All these effluents generally contain little biodegradable carbon, implying that the biological processing devices can be dimensioned almost exclusively for the processing of nitrogen. A biological processing of the "nitrate shunt" type would therefore allow significant cost reductions compared with conventional nitrification/denitrification.

Nitrate Shunt in SBR (Sequential Biological Reactors) Configuration

Fux, C., Lange K., Faessler, A., Huber, P., Grueniger, B. and Siegrist, H. (2003), in an article entitled "Nitrogen removal from digester supernatant via nitrite-SBR or SHARON?" appearing in the review Water Science and Technology, Vol. 48 No. 8, pp. 9-18 (2003) demonstrated the advantage of sequential biological reactors (SBR), comprising feed, reaction (aeration+anoxia), settling and removal phases, for the implementation of the nitrate shunt on nitrogen-concentrated effluents. In fact, this SBR configuration serves to apply larger volume feeds by biomass retention in the same reactor, unlike the SHARON method (patent EP-A-826639) for which the absence of biomass retention allows the specific leaching of the biomass responsible for the oxidation of the nitrites to nitrates. According to the SBR method of Fux et al, an inflow volume to be processed in a complete cycle is poured into the reactor in successive volume fractions, the complete processing cycle being divided into successive sub-cycles, each sub-cycle comprising a volume fraction feed phase, followed by an aeration phase to cause the nitrification, followed by an anoxia phase during which the aeration is stopped and a carbon-containing source is introduced into the reactor for converting the nitrites to nitrogen.

For releases such as anaerobic digester supernatants, gas processing condensates and landfill leachates, it is particularly difficult to optimize the nitrite production and reduction reactions, for two main reasons:

These releases are subject to extremely wide variations in flow rate and ammonium concentration, demanding the constant adjustment of the operating criteria to produce an effluent of constant quality.

Media heavily laden with salts and miscellaneous ionic compounds, such as those covered by the invention, are liable to have a negative effect on the sensitivity of the probes (contamination of redox probes by sulfides in particular) and to cause drifts that trigger a rapid transition to degraded timer mode.

The development of a robust management system is therefore desirable to ensure the reliability of the processing of nitrogen of concentrated effluents by nitrate shunt in an SBR reactor.

The present invention proposes to remove the nitrogen from concentrated effluents by a nitration/denitration method in a sequential biological reactor (SBR) in which the sequence comprises a plurality of fractionated feed/aeration/anoxia phases, the number and duration of these phases, and also the addition of carbon-containing reagent, being adjusted by a series of real-time measurements in the effluent to be processed, in the release, and in the biological reactor.

BRIEF SUMMARY OF THE INVENTION

According to the invention, the method for processing nitrogen-concentrated effluents, of the type initially defined, whereby an inflow volume to be processed in a complete cycle is poured into the reactor in successive volume fractions, the complete processing cycle being divided into successive sub-cycles, each sub-cycle comprising a phase of feeding with a volume fraction, followed by an aeration phase to cause the nitration, followed by an anoxia phase during which the aeration is stopped and a carbon-containing source is introduced into the reactor for converting the nitrites to nitrogen, is characterized in that a series of real-time measurements are taken in the effluent to be processed, in the release and in the biological reactor, the nitrogenous volume feed to be processed in the inflow is evaluated, and the number of feed phases of a complete cycle is determined according to said nitrogenous feed and the minimum volume of liquid in the reactor, according to the following formula:

$$Nalim_{min} = \frac{F_{NH4,j}}{\left([NH_4^+]_{inhib} - [NH_4^+]_{eff}\right) * V_{min} * N_{SBR}}$$

where, $Nalim_{min}$: minimum number of feed cycles $F_{NH4,j}$: daily nitrogenous feed $[NH_4^+]_{eff}$: ammonium concentration in the effluent from the reactor $V_{min}$: minimum liquid volume (after extraction and before feeding)

$N_{SBR}$: number of complete SBR cycles per day $[NH_4^+]_{inhib}$: inhibiting ammonium concentration in the nitriting biomass, in such a way that the nitrogen concentration of the volume fraction injected is diluted in the liquid volume remaining in the reactor, thereby avoiding the inhibition of the nitriting bacteria, the nitrogenous feed of the volume fraction being however sufficient for producing in the reactor a "single shot" or peak of the ammoniacal feed upon the pouring of each fraction, that is favorable to the development of the nitrite-producing biomass.

Preferably, the nitrogenous volume feed to be processed in the inflow is evaluated by measuring the conductivity (X) and the flow rate (Q) of the inflow.

Preferably, the dissolved oxygen concentration in the reactor is measured and controlled in order to maintain it at low values by limiting the duration of the aerated phases and by adjusting the oxygen input in the feed to be processed.

A minimum number $Nbiol_{min}$ of aerobic/anoxic sub-cycles can be determined in order to avoid exceeding a given total biological reaction time, selected in order to limit the fluctuations in dissolved oxygen concentration between 0 and 2 mg O2/l.

The pH is measured in the reactor and a pH self-regulation is provided by alternating nitration and denitration phases in close succession by limiting the pH fluctuations between 6.5 and 8.5, preferably between 7 and 8.

Biological cycles of the "aerobic/anoxic" type, with fixed durations of the aerated and anoxic phases are predefined, and the total time tC of these reaction phases is calculated according to the number of cycles NC:

$$tC = (t_{SBR} - t_{alim} - t_{sedim} - t_{extract})/NC$$

where, $t_{SBR}$: total SBR cycle time $t_{alim}$: total feed time (not fractionated)

$t_{sedim}$: settling phase time $t_{extract}$: extraction phase time.

The "aerobic/anoxic" biological cycle actually applied is the one in which the aeration time corresponds best to the theoretical aeration time calculated using the incoming feed, the configuration of the aeration system of the reactor, and the reaction kinetics. The duration of the anoxic phases is limited in order to limit the risks of anaerobiosis.

The injection time of the carbon-containing source during the anoxic phase is determined from measurements of the incoming nitrogenous feed. Preferably, the nitrogen removal efficiency is calculated and compared to a minimum efficiency, and the injection of the carbon-containing source during the anoxic phase is optimized according to the results of the comparison, by adjusting the input of reagent to the feed to be processed.

The method is advantageously applied to the processing of anaerobic digester supernatants, or to the processing of gas processing condensates, or to the processing of landfill leachates.

The invention also relates to an installation for processing nitrogen-concentrated effluents, in particular containing more than 100 mg N/l, by oxidizing ammonium to nitrites followed by a denitration of the nitrites to nitrogen gas in a sequential biological reactor in which the reaction phases are fractionated, said reactor containing nitrifying bacteria, the operating conditions being provided to privilege the action of the nitriting bacteria and to inhibit the action of the nitrating bacteria to the maximum, a volume of inflow to be processed in a complete cycle being poured into the reactor in successive volume fractions, the complete processing cycle being divided into successive sub-cycles, each sub-cycle comprising a phase of feeding with a volume fraction, followed by an aeration phase to cause the nitration, followed by an anoxia phase during which the aeration is stopped and a carbon-containing source is introduced into the reactor for converting the nitrites to nitrogen, an installation characterized in that it comprises means for evaluating the nitrogenous volume feed to be processed in the inflow, in particular by a probe for measuring the conductivity (X) and by a flowmeter for measuring the flow rate (Q) of the inflow, and a means for calculating and controlling the number of feed phases of a complete cycle according to said nitrogenous feed and to the minimum volume of liquid in the reactor, in such a way that the nitrogen concentration of the volume fraction injected is diluted in the liquid volume remaining in the reactor, thereby avoiding the inhibition of the nitriting bacteria, the nitrogenous feed of the volume fraction being however sufficient for producing in the reactor a "single shot" or peak of the ammoniacal feed upon the pouring of each fraction, that is favorable to the development of the nitrite-producing biomass.

The installation may comprise a conductivity measurement probe and a flowmeter in the outgoing effluent, and various sensors in the reactor, in particular conductivity, dissolved oxygen concentration, redox potential and pH sensors, all said probes and sensors being connected to the controller for continuously monitoring the evolution of the processing and the control of corrective measures.

Preferably, the installation comprises a carbon-containing source and a metering pump controlled by the controller for the injection time of the carbon-containing source during an anoxia phase, said injection time being determined from the measurements of the incoming nitrogenous feed.

The installation comprises aeration means controlled by the controller according to the measurements of the dissolved oxygen concentration.

By an optimized fractionation of the feed, aeration and anoxia steps of an SBR cycle into a plurality of phases, the invention serves to create beneficial effects for processing nitrogen by nitrate shunt:

a) "Single Shot" Ammoniacal Feed

In a continuous feed system, for example according to EP 0 826 639, the substrate concentration in the reactor is equal to that measured at the reactor outlet. Since the ammoniacal concentration directly determines the nitrite production kinetics, it is very difficult to obtain both a high conversion rate and yield.

In an SBR, the operation by successive volume fractions or batches serves to concentrate the ammonium ion at the beginning of the sub-cycle and to enhance the action of the nitriting bacteria, by inhibiting the nitrating bacteria, and thereby obtaining high reaction rates. On the contrary, given the high ammoniacal concentration of the medium, it is important to fractionate these single shot feeds to dilute them in the reactor, and avoid inhibiting the nitrite-producing biomass.

The method of the invention allows optimal fractionation of the feed in order to maximize the ammonium conversion rates while avoiding the inhibition of the biomass.

b) Management of Limited Aeration

The SBR configuration allows a retention of biomass. Accordingly, a selection of the nitrite-producing biomass by limiting the sludge age (principle of the method of EP 0 826 639) is no longer applicable. It therefore becomes necessary to maintain a low dissolved oxygen concentration in the biological pond during the aerated phase, to ensure the formation of nitrites while avoiding the formation of nitrates.

Owing to the wide variability of the effluent to be treated, there is a risk of poor adjustment of the oxygen inputs, whether of a deficient quantity or an inappropriate oxygen distribution over time during the aerobic/anoxic sequences.

The invention serves to obtain a better control of the dissolved oxygen concentration at low values while limiting the duration of the aerated phases and while adjusting the oxygen input to the feed to be processed.

c) Self-Regulation of the pH of the Medium

Maintaining the pH between 6.5 and 8.5 serves to prevent the inhibition of the ammonium-oxidizing biomass. In fact, the SBR method, applied to the nitrate shunt, is liable to amplify the ammoniacal feed surges with regard to the ammonium-oxidizing biomass at the beginning of each batch, and indirectly give rise to lower pH values during the aerated phase. This is because protons are liberated during the production of nitrites and hydroxyl ions are liberated during denitrification. Their impact on the pH of the medium is stronger if they can accumulate during a batch operation.

The invention allows better self-regulation of the pH of the medium by alternating the nitration and denitration phases in close succession.

d) Optimized Management of the Anoxia Phase

The maintenance of prolonged anoxia times in low feed conditions may lead to the establishment of anaerobic conditions, with a possible deterioration in the operation of the method and the contamination of the sensors employed.

The invention serves to limit the risks of anaerobiosis by limiting the duration of the anoxic phases.

Furthermore, the availability of biodegradable carbon during the anoxic phase must be guaranteed in order to complete the denitration. Since the effluents concerned typically contain very little biodegradable carbon, the denitrification step generally requires the addition of an external source. It is very important to optimize the quantity of reagent added, which represents one of the main method cost items. In general, a certain constant dose is applied as a function of a predefined mean nitrogenous feed, in a theoretical stoichiometric ratio or an experimentally determined ratio.

The invention allows an optimization of the biodegradable carbon addition while adjusting the reagent input to the feed to be processed.

Apart from the arrangements described above, the invention comprises a number of other arrangements which are discussed more explicitly below in conjunction with an exemplary embodiment described with reference to the appended drawings, but which is nonlimiting.

BRIEF DESCRIPTION OF THE DRAWINGS

In these drawings:

FIG. 1 is a diagram of an installation with a sequential biological reactor for implementing the method of the invention.

FIG. 2 is a graph showing the variation in level in the reactor, as a function of time, during a processing cycle.

FIG. 3 shows the successive phases of a cycle, with subcycles.

DETAILED DESCRIPTION OF THE INVENTION

Figure 4:
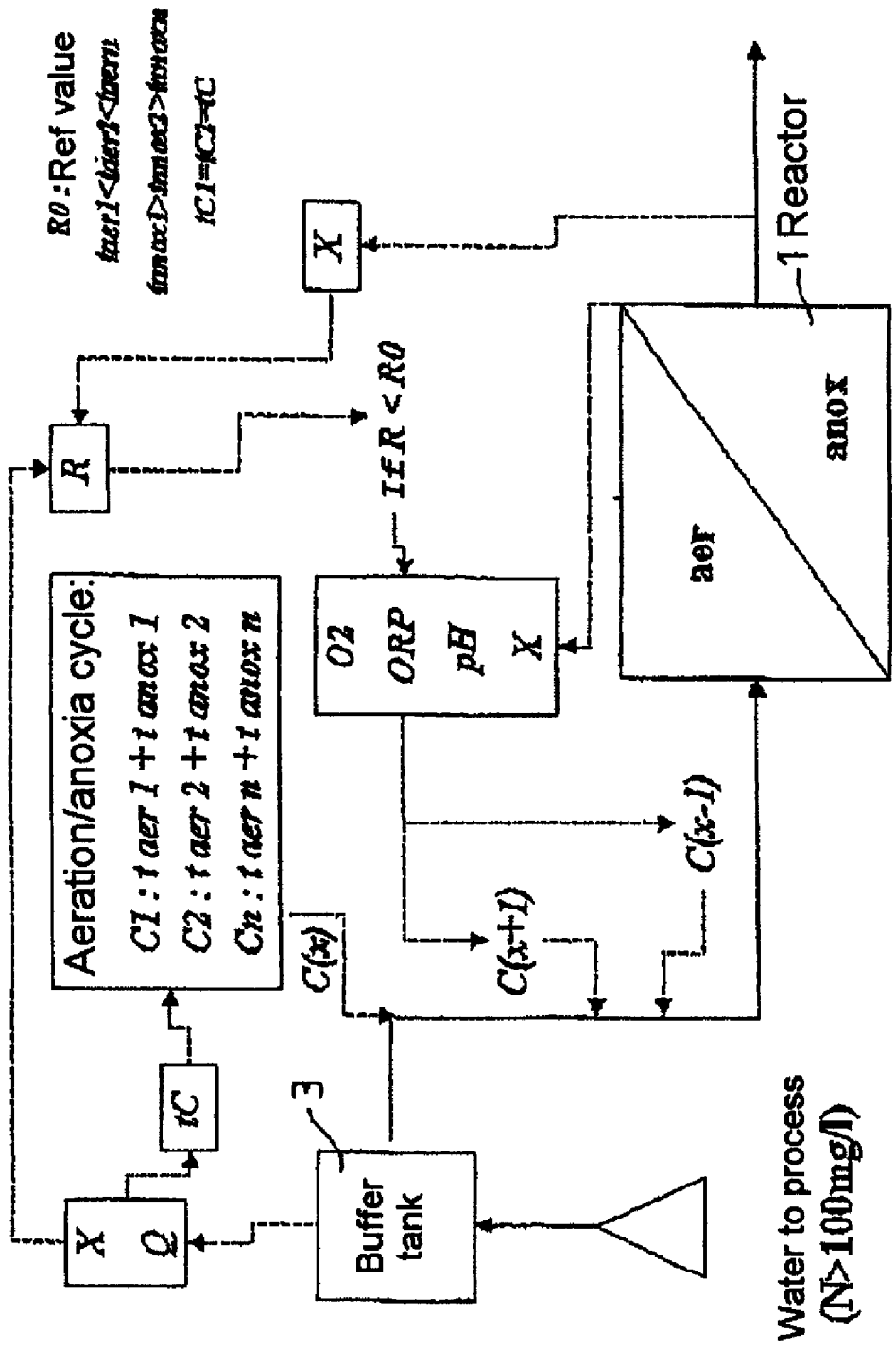
FIG. 4 is a block diagram of the installation operating according to the method.

FIG. 1 of the drawing shows an installation for processing ammonium-concentrated effluents, generally having a nitrogen concentration above 100 mg N/l (100 mg nitrogen/liter). The installation comprises a sequential biological reactor 1 which is filled, for a complete cycle, with volume fractions or batches, and drained after processing. The effluents poured into the reactor 1 are also called "inflows". A minimum volume of liquid Vmin subsists in the reactor 1 after drainage, the level of said liquid being shown by the horizontal line 2 in FIG. 1.

The sequential biological reactor, or SBR, contains nitrifying bacteria, comprising nitriting bacteria (oxidizing ammonium to nitrites) and nitrating bacteria (oxidizing nitrites to nitrates). The operating conditions are provided to privilege the action of the nitriting bacteria converting ammonium to nitrites to the maximum and to inhibit the action of the nitrating bacteria to the maximum, to avoid the conversion of nitrites to nitrates.

A buffer tank 3 is provided upstream of the reactor 1. The feed to the reactor 1 of inflow to be processed is provided by a pump 4 mounted on a pipe 5 from the buffer tank 3. Drainage is provided, for example, by a pump 6 and a pipe 7 forming an immersion tube up to the level 2. A carbon-containing source 8, for example a methanol tank, is provided to enable a metering pump 9 to inject a dose of methanol, or of another carbon-containing source, into the reactor during the anoxia phases. Aeration means 10 are provided in the bottom of the reactor 1, for example perforated tubes, connected to a pressurized air source, for example a booster 11, via a solenoid valve 12.

During a processing sub-cycle, after feeding the volume fraction, in a first aerobic phase an aeration of the reactor 1 is carried out by sending air into the tubes 10 and by the formation of bubbles in the inflow contained in the reactor to cause the conversion of the ammonium to nitrites under the action of the nitriting bacteria (nitration). In a subsequent anoxia phase, the aeration is stopped and a carbon-containing source, for example methanol, is introduced into the reactor 1 using the metering pump 9, for converting the nitrites to nitrogen. The combination of the aerobic phase and the anoxic phase constitutes the biological cycle of the sub-cycle.

The expression "complete cycle", is used to designate the overall operations conducted to process a volume corresponding to the capacity of the reactor between the maximum level 13 and the minimum level 2 of liquid. At the start of the complete cycle, the level is at the minimum, and the reactor is then filled to the maximum level 13 and, after processing, the reactor is drained to its minimum level 2.

For a complete cycle, the reactor 1 is fed with successive volume fractions. The inflow volume of each fraction only accounts for part of the capacity of the reactor, so that the nitrogen concentration of the inflow is diluted in the content of the reactor and remains acceptable to avoid inhibiting the nitriting bacteria by an excessive nitrogen concentration. Thus, the successive inflow fractions introduced into the reactor will cause the liquid level to rise in successive increments 14, 15, 16 and 13 (FIG. 2), or four increments in the example considered. If the incoming inflow has a concentration substantially higher than the concentration inhibiting the nitriting bacteria not to be exceeded, the fractionation of the feed causes a dilution of the fraction poured into the liquid volume already present in the reactor 1, thereby avoiding exceeding the inhibiting concentration.

At the start of the injection of each inflow volume fraction, a "single shot" or peak P (FIG. 5) of ammoniacal feed occurs, favorable to the development of the nitriting biomass to the detriment of the nitrating biomass, despite the retention of sludge specific to the reactor 1. Preferably, the peak P remains above 125% of the ammoniacal concentration characterizing the end of the sub-cycle concerned, during a period at least as long as a quarter of the sub-cycle time.

Measurement probes and sensors are provided at various locations of the installation. A probe 17 for measuring the conductivity of the effluent and a flowmeter 18 are provided on the effluent inlet pipe. The measurement results are sent in the form of electrical signals to electronic computation and control means, formed in particular of a computer or controller C with a microprocessor. These conductivity and flow rate measurements enable C to determine the nitrogen feed that enters the reactor 1 during a given time interval. A conductivity measurement probe 19 and a flowmeter 20 are provided on the drainpipe; the measurement results are also sent to the controller C. In the liquid of the reactor 1, constituting the biological pond, a probe 21 is provided for measuring the dissolved oxygen, a probe 22 for measuring the redox potential, a probe 23 for measuring the pH and a temperature sensor 24. All these probes or sensors are connected to the controller C, which orders the starting or stopping of the pumps 4, 6 and 9, and the opening or closure of the solenoid valve 12 and the operation or shutdown of the booster 11.

As shown schematically by the lower part of FIG. 3, a complete cycle comprises a plurality of successive sub-cycles, each sub-cycle comprising the following steps:
  feed of a volume fraction,
  and a biological cycle with
    an aeration phase for aerobic nitration processing,
    and an anoxia phase for converting the nitrites to nitrogen.

The complete cycle terminates in a settling step, followed by drainage. The durations of the various phases and steps may vary.

The upper part of FIG. 3 schematically shows the "single shots" or peaks P of ammoniacal feed [NH4+], expressed in mg N/l, caused by the feed at the start of each sub-cycle. The peaks P are shown more accurately on the graph in FIG. 5.

In order to adapt the operation of the method to the variability of the inflow to be processed, the number and duration of the phases and the addition of carbon-containing reagent 8 are determined by the controller C, using a program introduced into said controller, from real-time measurements, at three levels:

1) in the raw inflow, to determine the incoming nitrogenous feed and to accurately determine the number of "feed/aeration/anoxia" sub-cycles, the aeration time and the addition of carbon-containing source,
2) in the release, to determine the processing yield and allow retroactive adjustment of the method,
3) in the biological reactor, to control the satisfactory progress of the biological processes during the aerated and anoxic cycles.

The various elements of the method of the invention are described in detail below.

1) Use of Measurements in the Inflow to be Processed

The incoming nitrogenous feed during a given time interval is determined, for example, by measuring the conductivity with the probe 17 and the flow rate with the flowmeter 18, or through the use of specific sensors:
  An optimal fractionation of the feed during the overall SBR cycle is carried out in order to dope the nitrite production kinetics by single shots of ammoniacal concentration, but by avoiding a deterioration of the bacterial activity. This fractionation is obtained by ordering the running or stopping of the pump 4.
  The daily oxygen needs are estimated, and also the duration of the aeration phase necessary to satisfy this demand according to the aeration capacity installed and the number of aeration/anoxia cycles applied. The booster 11 and the valve 12 are controlled accordingly by C.
  The biodegradable carbon requirements are calculated from theoretical or experimental ratios, and the operating time of the carbon-containing reagent metering pump 9 during the anoxia phase is fixed accordingly. The operation of the pump 9 is controlled by C.

The minimum number of feed phases Nalim$_{min}$ (or number of successive volume fractions) of a complete SBR cycle is determined by the controller C according to the nitrogenous volume feed to be processed (a higher feed requiring an increase in the number of cycles), in order to avoid inhibition by the ammoniacal concentration. The following formula can be employed to calculate the minimum fractionation to be applied to the daily feed:

$$Nalim_{min} = \frac{F_{NH4,j}}{\left([NH_4^+]_{inhib} - [NH_4^+]_{eff}\right) * V_{min} * N_{SBR}}$$

where,

Nalim$_{min}$: minimum number of feed phases (or volume fractions)

$F_{NH4,j}$: daily nitrogenous feed $[NH_4^+]_{eff}$: ammonium concentration in the effluent from the reactor $V_{min}$: minimum liquid volume (after draining/extraction and before feeding)

$N_{SBR}$: number of complete SBR cycles per day $[NH_4^+]_{inhib}$: inhibiting ammonium concentration in the nitriting biomass;

it depends on the pH and temperature of the medium and the ammonia concentration $[NH_3]_{inhib}$ inhibiting the bacterial population present in the reactor, in the form:

$$[NH_4^+]_{inhib} = \frac{14}{17} * \frac{[NH_3]_{inhib} * (K_w/K_b + 10^{pH})}{10^{pH}} \text{ where } K_w/K_b = e^{344/(273+T(^\circ C.))}$$

Concentrations of about 10 mg N-NH$_3$/l may already be toxic for nitriting bacteria.

The controller C determines a minimum number Nbiol$_{min}$ of aerobic/anoxic sub-cycles in order to avoid exceeding a given total biological reaction time, selected in order to avoid excessive fluctuations in dissolved oxygen concentration and pH, and also prolonged periods of anoxia.

In order to maintain the robustness and uniformity of the processing, it is important to make the number of feeds coincide with the number of aerobic/anoxic sub-cycles so as to apply a single "feed/aerobic/anoxia" sub-cycle. The number NC of sub-cycles actually applied is therefore the highest value between Nalim$_{min}$ and Nbiol$_{min}$.

Once the number of "feed/aerobic/anoxia" sub-cycles is defined, a number of "aerobic/anoxic" type sub-cycles, of which the durations of the aerated and anoxic phases are fixed, are predefined. The total time tC of these reaction phases is calculated according to the number of sub-cycles NC:

$$tC = (t_{SBR} - t_{alim} - t_{sedim} - t_{extract})/NC$$

The "aerobic/anoxic" sub-cycle actually applied is the one of which the aeration time corresponds best to the theoretical aeration time calculated by the controller C from the incoming feed, the configuration of the reactor aeration system, and the reaction kinetics. Similarly, an operating time of the methanol metering pump 9 can be determined by C from measurements of the incoming nitrogenous feed.

The calculation of the average nitrogenous feed is carried out over a relevant period, for example the duration of the biological cycle, the feed period, the hydraulic residence time or the day, because given the intrinsic variability of the types of effluent processed, an excessively short time step would lead to instability of the system and an excessively long time step would lead to a level of aeration and/or addition of carbon-containing source that is generally inappropriate to the grade of effluent to be processed.

2) Use of Measurements in the Release

It is possible to improve the aeration control by introducing an automatic retroactive adjustment as a function of the nitrogen removal efficiency of the biological processing, calculated by C from in-line measurements at the inlet and outlet of the reactor 1.

In order to optimize the carbon-containing reagent addition, an automatic system can be installed for retroactively adjusting the operating time of the metering pump 9 from measurements at the inlet (17, 18) and outlet (19, 20) of the biological pond. If the nitrogen removal efficiency calculated by the controller C is higher than a predefined minimum efficiency, the controller C orders a decrease in the operating time of the metering pump 9 in order to reduce the quantity of carbon-containing reagent added (initially calculated according to the incoming feed). In case of deterioration of the quality of the processed inflow leaving the reactor 1, the first corrective action ordered by the controller C is the restoration of the initial operating time of the metering pump 9. The frequency of this adjustment should reach at least three sludge ages to avoid introducing excessive disturbances into the system. It may be recalled that the sludge age is the ratio of the mass of sludge present in the reactor to the mass of daily sludge extracted from the reactor.

This application is particularly useful in connection with the processing of nitrogen-concentrated effluents to which the method of the invention applies, for which alternative autotrophic denitrification processes have been identified, leading to practically zero requirements of biodegradable carbon.

In order to command an appropriate corrective action, it is often useful to couple this data with that supplied by sensors indicating the status of the system in the biological pond, that is, in the liquid contained in the reactor 1.

3) Use of Measurements in the Biological Pond

The method can use the information supplied by various sensors in the biological pond, such as sensors of conductivity 21, dissolved oxygen concentration 22, redox potential 23 and pH 24, connected to the controller C, and which allow the continuous monitoring of the evolution of the processing and the ordering of corrective actions. Temperature sensors are provided: the temperature in the reactor is measured, and the temperature is regulated in order to maintain it between 5 and 45° C.

The duration of the aerated and anoxic phases initially defined according to the nitrogenous feed to be processed and optionally the nitrogen removal efficiency, can therefore be adjusted by the controller C according to setpoints or thresholds of conductivity, dissolved oxygen concentration, redox potential and/or pH. Thus, the operation of the aeration device 10, 11 may be:

regulated according to a setpoint of dissolved oxygen and/or the derivative of redox potential and/or of conductivity;

stopped or restarted according to thresholds of dissolved oxygen and/or redox potential and/or pH, the controller C ordering the starting or stopping of the booster 11, with opening or closure of the valve 12.

The choice of the sensors and of the type of regulation of the aeration is conditioned by the particular technical and economic requirements of the system.

The diagram in FIG. 4 shows a complete management system based on measurements of flow rate Q and conductivity X at the inlet and outlet of the reactor 1 and on measurements of the dissolved oxygen concentration O2, pH, redox potential ORP and conductivity X in the biological reactor 1. The measurement of the feed entering the reactor serves to define a number of sub-cycles NC having a duration tC, and a duration of the aerated phases (t aer) and the anoxic phases (t anox). The lower option C(x−1) or higher option C(x+1) is fine-tuned according to the calculations of efficiency (R) and in-line measurements in the biological reactor.

Example

Figure 6:
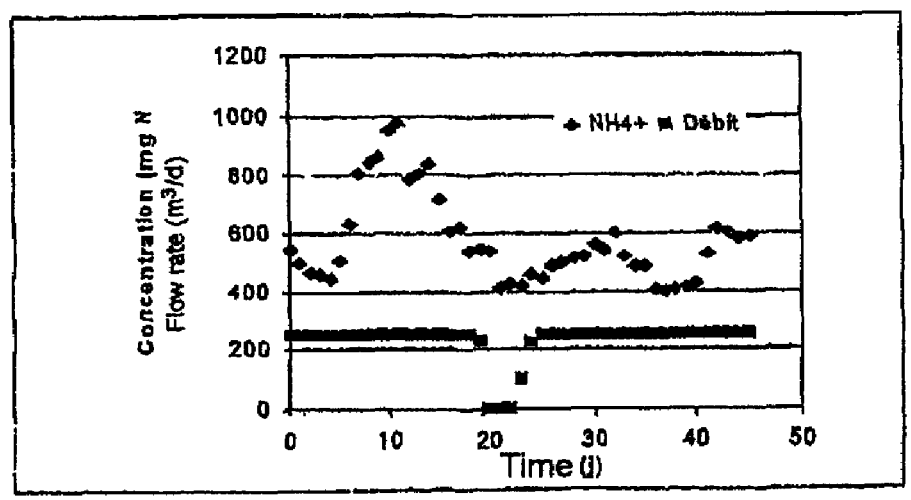
FIG. 6 is a graph showing the variations in ammoniacal concentration expressed in mg N/l and of flow rate expressed in $m^3/d$ ($m^3$/day) plotted on the y-axis, as a function of time, expressed in days, plotted on the x-axis.

The average nitrogenous feed of a digested sludge centrifugation supernatant is 150 kg N/d for an average concentration of 600 mg N—$NH_4^+$/l, but varies between 400 and 1000 N—$NH_4^+$/l. It is also considered that the feed is stopped for three days after a centrifuge breakdown around the twentieth day giving rise to a zero flow (FIG. 6).

This nitrogenous feed is processed in a sequential biological reactor (SBR) with a capacity of 450 m$^3$ and a liquid height of between 3 and 4 m, in three complete cycles of 8 h/d. A fraction of the minimum feed ($Nalim_{min}$) into 4 phases was calculated with the following assumptions: $[NH_4^+]_{eff}$=50 mg N/l, $[NH_3]_{inhib}$=10 mg N—$NH_3$/l, pH=8.3, T=25° C. The resulting biological time tC, of 90 minutes, was consistent with the minimum fixed for the system. Four "feed/aeration/anoxia" sub-cycles were therefore applied before the settling and withdrawal steps in order to avoid inhibition by the ammoniacal concentration at the highest pH, so as to apply a sufficient aeration time and to avoid prolonged periods of anoxia. In this configuration, five biological reaction time options (aeration/anoxia) were defined (Table 1).

TABLE 1

Complete cycles and biological cycles (of sub-cycles) of the SBR reactor employed for processing the nitrogen of digester effluents by nitrate shunt.

| No. of SBR cyles/day | 3 |
| SBR cycle time | 8 h |
| Feed time | 60 min |
| Settling time | 30 min |
| Extraction time | 30 min |
| No. biol cycles/SBR cycle | 4 |
| Biol time/SBR cycle | 90 min |

|  | min/cycle | | h/d | |
| --- | --- | --- | --- | --- |
| Biological Cycle | aeration | anoxia | aeration | anoxia |
| Cycle 1 | 15 | 75 | 6 | 18 |
| Cycle 2 | 30 | 60 | 9 | 15 |
| Cycle 3 | 45 | 45 | 12 | 12 |
| Cycle 4 | 60 | 30 | 15 | 9 |
| Cycle 5 | 75 | 15 | 18 | 6 |

The incoming nitrogenous feed is calculated by the controller C once per day from the means of the conductivity measurements, supplied by the probe 17, and the feed rate supplied by the flowmeter 18. The conductivity/ammonium relation was previously established for this effluent. The theoretical aeration and anoxia times were calculated from the feed to be processed as a function of the oxygen requirements (compared to the nitrite intermediate), by checking that the reaction kinetics was not limiting. In this way, the closest of the five predefined time options was applied. At the same time, the operating time of the methanol metering pump 9 was determined as a function of the biodegradable carbon requirements (compared to the nitrite intermediate) of the incoming feed, by checking that the kinetics was not limiting.

Figure 5:
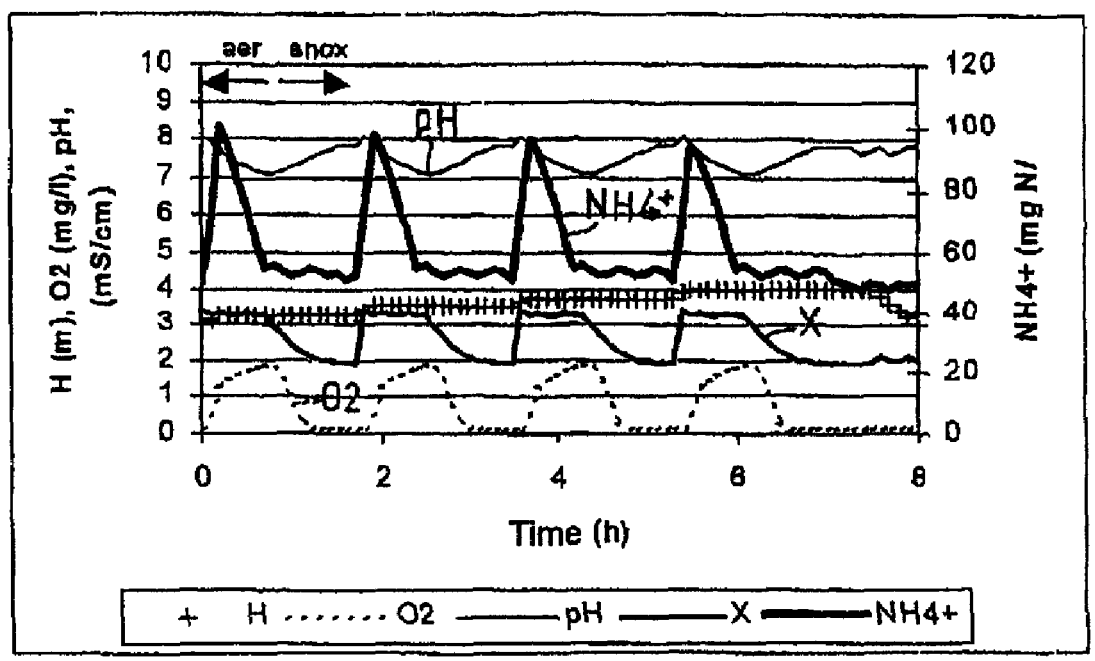
FIG. 5 is a graph showing the variations, in the reactor, of the values:
water height, expressed in meters (m),
dissolved oxygen concentration expressed in mg/l,
pH,
conductivity X expressed in mS/cm (millisiemens percentimeter)
and ammonium concentration expressed in mg N/l
plotted on the y-axis, as a function of time in hours plotted on the x-axis.

FIG. 5 shows a typical evolution of the monitoring and control parameters in the reactor 1 during the four sub-cycles of a complete cycle of 8 h:

Dissolved Oxygen Concentration
  The dissolved oxygen probe 22 allows the regulation of the aeration between the setpoints of 1 and 2 mg $O_2$/l; a longer aerated phase time would imply more frequent stops and restarts of the booster 11.
  The dotted O2 curve in FIG. 5 represents the variations in the O2 concentration which increases in aerobic conditions and decreases to zero in anoxic conditions.

pH
  The pH curve shows the variations in pH which decreases in the aerobic phase and increases in the anoxic phase. The pH remains between 6.5 and 8.5, in practice between 7 and 8.
  If the feed were not fractionated, the pH would probably be lower during the aerobic phases, falling to values inhibiting the activity of the ammonium-oxidizing bacteria.

Conductivity
  The X (conductivity) curve shows a drop in conductivity during the anoxic denitration phase as a consequence of conversion of nitrogenous ion forms to nitrogen gas. At the end of the period, the derivative of the conductivity tends toward zero, reflecting complete denitrification.
  The $NH_4^+$ curve shows peaks P of ammoniacal concentration, or ammoniacal "single shots", at the start of the feed of each volume fraction, corresponding with the increments in the water height H curve. The peaks P reach 100 mg N/l and only remain above 65 mg N/l (125% of 52 mg N/l measured at the end of the sub-cycle) during a time interval shorter than a quarter of the sub-cycle time.

The removal of the ammoniacal nitrogen from the system takes place by nitrate shunt, with oxidation of the ammonium to nitrites during the aerated phase and a reduction of the nitrites to nitrogen gas during the anoxic phase, thanks to the methanol addition. The pressure applied by the ammoniacal "single shots" at the start of each biological sub-cycle, combined with the maintenance of low dissolved oxygen concentrations during the aerated phase, allows the selective development of the nitriting biomass to the detriment of the nitrating biomass, despite the retention of sludge specific to the SBR reactor.

The measurement of the conductivity at the end of the processing, by the probe 19, allows a regular evaluation of the nitrogen removal efficiency, and serves as an alarm to correct any drifts of the system. Thus, a minimum efficiency of 80% being fixed, it has dropped to 70% while the biological cycle No. 2 was applied. The controller C has checked that the dissolved oxygen concentration did not exceed 1 mg/l during the aerated phases of the day, reflecting incomplete oxidation of the ammoniacal feed, and cycle No. 3, comprising a longer aerated phase, was ordered. The conductivity measurement by the sensor 21 in the biological reactor may also prove to be useful. Thus, a few days later, a new drop in efficiency has been observed whereas the derivative of the conductivity measurement during the anoxic phases did not tend toward 0, reflecting incomplete denitrification. The subsequent action was to apply cycle No. 2.

A loop for readjusting the methanol addition added was finally installed, in order to reduce the operating time of the metering pump 9 every 15 days. In case of a drop in nitrogen removal efficiency below the minimum value set, the operating time of the pump 9 was restored to the previous value.

The method of the invention serves to achieve considerable savings in aeration energy (25%) in the addition of carbon-containing reagent (minimum of 40%) and in the production of sludge (about 30%), while permanently providing sufficient quantities of air and carbon to process the polluting feed in a sequential biological reactor. This configuration serves to apply volume feeds larger than those of other continuous feed reactors described previously for processing nitrogen by nitrate shunt.

The invention claimed is:

1. A method for processing nitrogen-concentrated effluents, by oxidizing ammonium to nitrites followed by a denitration of the nitrites to nitrogen gas in a sequential biological reactor in which reaction phases are fractionated, said reactor containing nitrifying bacteria, operating conditions being provided to privilege the action of nitriting bacteria and to inhibit the action of the nitrating bacteria to the maximum, a method whereby an inflow volume to be processed in a complete cycle is poured into the reactor in successive volume fractions, the complete processing cycle being divided into successive sub-cycles, each sub-cycle comprising a phase of feeding with a volume fraction, followed by an aeration phase to cause the nitrification, followed by an anoxia phase during which the aeration is stopped and a carbon-containing source is introduced into the reactor for converting the nitrites to nitrogen, wherein a series of real-time measurements are taken in the effluent to be processed, in the release and in the biological reactor, the nitrogenous volume feed to be processed in the inflow is evaluated, and the minimum number of feed phases of a complete cycle is determined according to said nitrogenous feed and the minimum volume of liquid in the reactor, according to the following formula:

$$Nalim_{min} = \frac{F_{NH4,j}}{([NH_4^+]_{inhib} - [NH_4^+]_{eff}) * V_{min} * N_{SBR}}$$

where,
$Nalim_{min}$: minimum number of feed cycles
$F_{NH4,j}$: daily nitrogenous feed
$[NH_4^+]_{eff}$: ammonium concentration in the effluent from the reactor
$V_{min}$: minimum liquid volume (after extraction and before feeding)
$N_{SBR}$: number of complete SBR cycles per day
$[NH_4^+]_{inhib}$: inhibiting ammonium concentration in the nitriting biomass.

in such a way that the nitrogen concentration of volume fraction injected is diluted in liquid volume remaining in the reactor, thereby avoiding the inhibition of the nitriting bacteria, the nitrogenous feed of the volume fraction being however sufficient for producing in the reactor a "single shot" or peak (P) of the ammoniacal feed upon the pouring of each fraction, that is favorable to the development of the nitrite-producing biomass.

2. The method as claimed in claim 1, wherein the nitrogenous volume feed to be processed in the inflow is evaluated by measuring the conductivity (X) and the flow rate (Q) of the inflow.

3. The method as claimed in claim 1, wherein the peak (P) ammoniacal feed upon the pouring of each fraction, remains higher, at 125% of the ammoniacal concentration characterizing the end of the sub-cycle concerned, during a period not longer than a quarter of the duration of the sub-cycle.

4. The method as claimed in claim 1, wherein the dissolved oxygen concentration in the reactor is measured and controlled in order to maintain it at low values by limiting the duration of the aerated phases and by adjusting the oxygen input in the feed to be processed.

5. The method as claimed in claim 4, wherein the fluctuations in the dissolved oxygen concentration are limited between 0 and 2 mg O2/l by a minimum number of aerobic/anoxic sub-cycles $Nbiol_{min}$.

6. The method as claimed in claim 5, wherein the number (NC) of sub-cycles actually applied is the highest value between $Nalim_{min}$ and $NbiOl_{min}$.

7. The method as claimed in claim 1, wherein the pH is measured in the reactor and a pH self-regulation is provided by alternating nitration and denitration phases in close succession by limiting the pH fluctuations between 6.5 and 8.5.

8. The method as claimed in claim 1, wherein the temperature is measured in the reactor, and a temperature regulation is provided in order to maintain it between 5 and 45° C.

9. The method as claimed in claim 1, wherein biological cycles of the "aerobic/anoxic" type, with fixed durations of the aerated and anoxic phases are predefined, and the total time tC of these reaction phases is calculated according to the number of cycles NC:

$$tC = (t_{SBR} - t_{alim} - t_{sedim} - t_{extract})/NC$$

where,
$t_{SBR}$: total SBR cycle time
$t_{alim}$: total feed time (not fractionated)
$t_{sedim}$: settling phase time
$t_{extract}$: extraction phase time.

10. The method as claimed in claim 1, wherein injection time of the carbon-containing source during the anoxic phase is determined from the measurements of the incoming nitrogenous feed.

11. The method as claimed in claim 1, wherein the method is applied to the processing of the anaerobic digester supernatants.

12. The method as claimed in claim 1, wherein the method is applied to the processing of gas processing condensates.

13. The method as claimed in claim 1, wherein the method is applied to the processing of landfill leachates.

14. The method as claimed in claim 1, wherein the pH is measured in the reactor and a pH self-regulation is provided by alternating nitration and denitration phases in close succession by limiting the pH fluctuations between 7 and 8.

15. An installation for processing nitrogen-concentrated effluents, in particular containing more than 100 mg N/l, by oxidizing ammonium to nitrites followed by a denitration of the nitrites to nitrogen gas in a sequential biological reactor (1) in which the reaction phases are fractionated, said reactor containing nitrifying bacteria, the operating conditions being provided to privilege the action of nitriting bacteria and to inhibit the action of nitrating bacteria to the maximum, a volume of inflow to be processed in a complete cycle being poured into the reactor in successive volume fractions, the complete processing cycle being divided into successive sub-cycles, each sub-cycle comprising a phase of feeding with a volume fraction, followed by an aeration phase to cause the nitration, followed by an anoxia phase during which the aeration is stopped and a carbon-containing source is introduced into the reactor for converting the nitrites to nitrogen, wherein the installation comprises means (17, 18, C) for taking a series of real-time measurements in the effluent to be processed, in the release and in the biological reactor, and for evaluating the nitrogenous volume feed to be processed in the inflow, in particular by a probe (17) for measuring the conductivity (X) and by a flowmeter (18) for measuring the flow rate (Q) of the inflow, and a means (C) for calculating and controlling the number of feed phases of a complete cycle according to said nitrogenous feed and to the minimum volume of liquid in the reactor, in such a way that the nitrogen concentration of the volume fraction injected is diluted in the liquid volume remaining in the reactor, thereby avoiding the inhibition of the nitriting bacteria, the nitrogenous feed of the volume fraction being however sufficient for producing in the reactor a "single shot" or peak (P) of the ammoniacal feed upon the pouring of each fraction, that is favorable to the development of nitrite-producing biomass.

16. The installation as claimed in claim 15, wherein the installation comprises a conductivity measurement probe (19) and a flowmeter (20) in the outgoing effluent, and various sensors in the reactor (1), in particular conductivity (21); dissolved oxygen concentration (22), redox potential (23) and pH (24) sensors, all said probes and sensors being connected to the controller (C) for continuously monitoring the evolution of the processing and the control of corrective measures.

17. The installation as claimed in claim 15, wherein the installation comprises a carbon-containing source (8) and a metering pump (9) controlled by the controller (C) for the injection time of the carbon-containing source during an anoxia phase, said injection time being determined from the measurements of the incoming nitrogenous feed.

18. The installation as claimed in claim 15, wherein the installation comprises aeration means (10,11,12) controlled by a controller (C) according to the measurements of the dissolved oxygen concentration.

* * * * *